Dec. 7, 1937. L. H. RANDALL 2,101,754
CARRIAGE RELEASE FOR LATHES
Filed April 3, 1937 2 Sheets-Sheet 1

Laurence Harrington Randall
INVENTOR
BY Victor J. Evans & Co.
ATTORNEYS

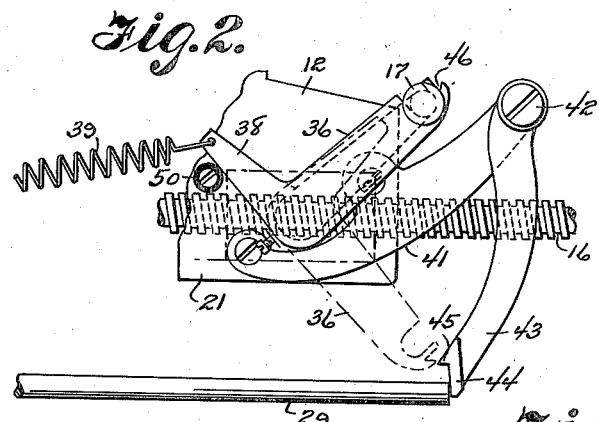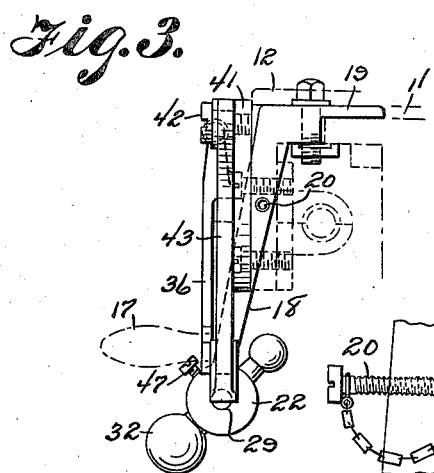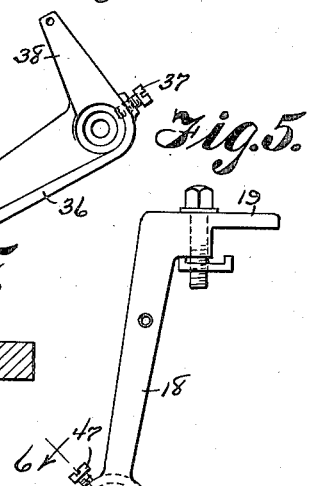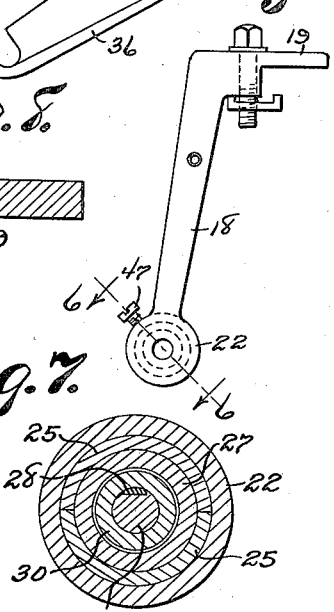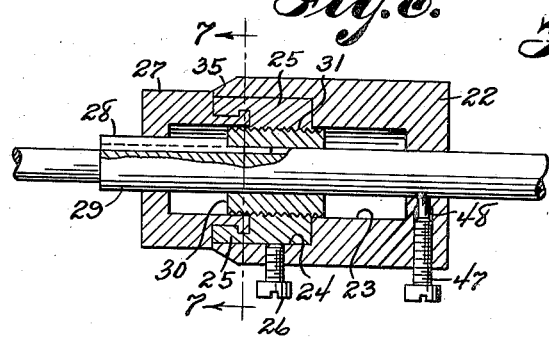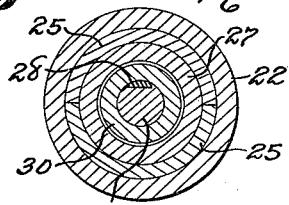

Patented Dec. 7, 1937

2,101,754

UNITED STATES PATENT OFFICE 2,101,754

CARRIAGE RELEASE FOR LATHES

Laurence Harrington Randall, Lakeland, Fla., assignor of one-half to Anna M. Randall, Daytona Beach, Fla.

Application April 3, 1937, Serial No. 134,763

9 Claims. (Cl. 82—21)

The invention relates to a lathe attachment and more especially to an automatic carriage release or stop for lathes.

One of the notable disadvantages heretofore encountered in the operation of lathes, more especially engine lathes, has been the danger of running upon the work a cutting, threading, boring, facing, knurling, or other lathe tool, up to a faced shoulder, to the bottom of a boring, or up to similar obstruction by means of the lathe carriage drive from the lead screw, and there, with precision and skill release the carriage from its engagement from said lead screw by manual manipulation of the carriage release lever, the danger being that the tool may become workably engaged against such obstruction before the operator can disengage said carriage from said lead screw, such accidental engagement of the tool with such obstruction throwing great strain upon the entire motivating mechanism of the lathe carriage, with danger of breakage or harm thereto and danger of breakage or harm to the tool or the work or both; and further, that the said tool having become inadvertently engaged against said obstruction, the carriage half nuts engaging the lead screw become immovably and undisengagably locked by reason of such strain or pressure upon the carriage releasing mechanism necessitating, first, the stopping of the lathe and, second, the relieving of accumulated stress upon the affected moving parts thereof before said carriage releasing lever may be manually operated to release said carriage from its engagement with the lead screw.

The primary object of the present invention is the provision of a release or stop of this character, wherein there is effected instantaneous release of the carriage from the lead screw or spindle of a lathe and the consequent instantaneous stoppage of the carriage at any desired point along the bed way of the said lathe, irrespective of spindle or lead screw speed action.

Another object of the invention is the provision of a release or stop of this character, wherein cessation of the travel of the carriage is accurate to within 1/1000 of an inch, the release or stop functioning equally well on either heavy or light cuts, fine or coarse feed, on large or small diameter work and at all practicable spindle and lead screw speeds, being ideal for external cutting or facing, internal boring or facing, the micrometrically measured pointing or spacing of cuts laterally along the work and the cutting of threads on the lathe in conjunction with the threading dial or other carriage and lead screw coordinating device, admitting the cutting of threads up to a given point such as a faced shoulder or the bottom of a boring with positive safety and far greater accuracy than can be attained by hand release.

A further object of the invention is the provision of a release or stop of this character, wherein micrometer adjustment is possible and consequently the cutting of internal and external shoulders on the lathe to the required depth with utmost accuracy will be assured.

A still further object of the invention is the provision of a release or stop of this character, which is comparatively simple in construction, thoroughly reliable and efficient in operation, accurate, automatically effective, positive with precision and adjustability prevailing, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 2 is a fragmentary side elevation showing the release or stop by full lines in its releasing position and by dotted lines in normal position.

Figure 3 is a fragmentary end or edge elevation of the release or stop.

Figure 4 is a perspective view of an adjunct of the release or stop.

Figure 5 is a front elevation of the micrometer bracket or hanger.

Figure 6 is a sectional view on the line 6—6 of Figure 5 looking in the direction of the arrows.

Figure 7 is a sectional view on the line 7—7 of Figure 6 looking in the direction of the arrows.

Figure 8 is a longitudinal sectional view through the extension gage.

Similar reference characters indicate corresponding parts throughout the several views in the drawings.

Figure 1:
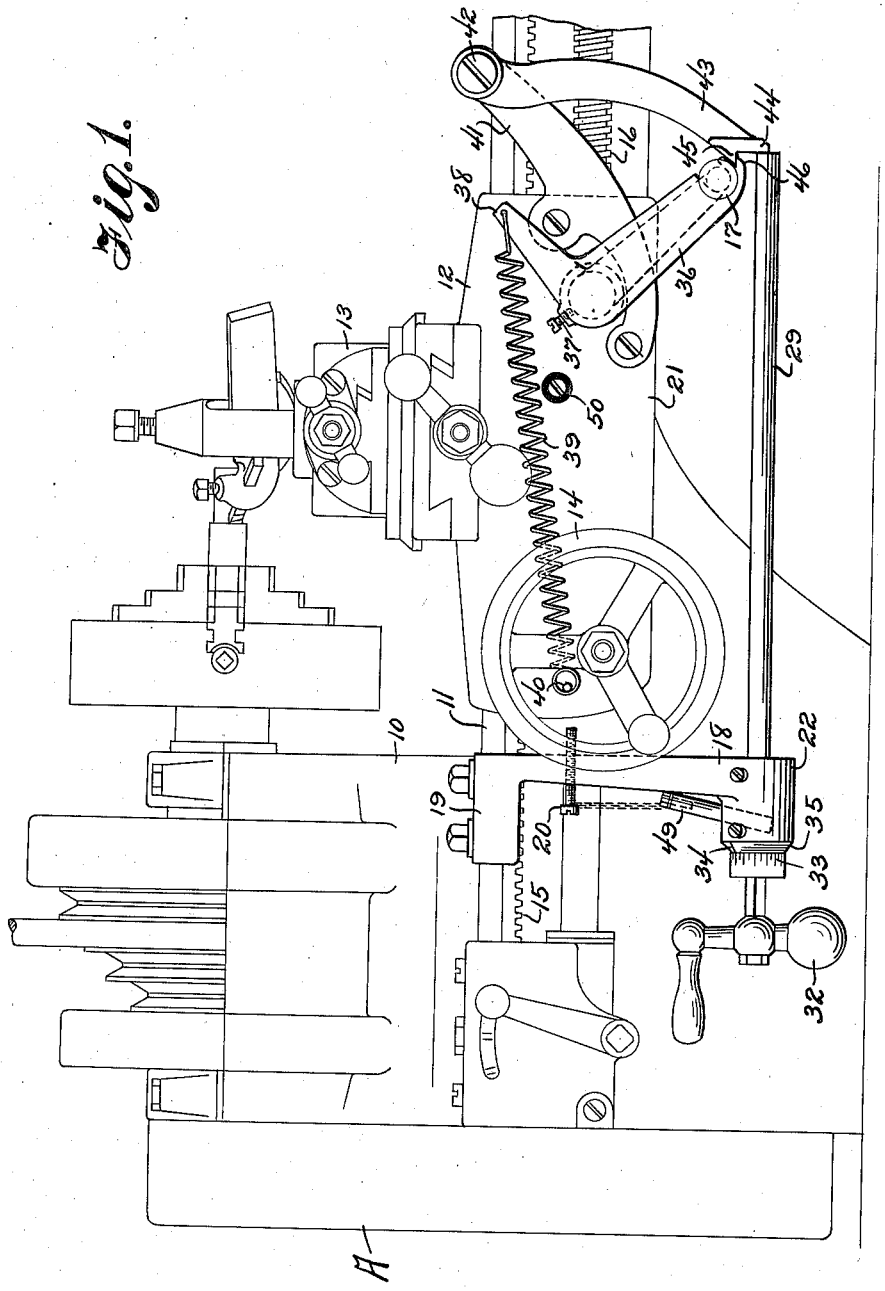
Figure 1 is a fragmentary side elevation of a lathe showing the release or stop constructed in accordance with the invention associated therewith.

Referring to the drawings in detail, A designates generally a portion of a lathe equipped with a head stock 10 carried by the bed, a portion thereof being indicated at 11 upon which travels the carriage 12 equipped as usual with a tool support 13 of any conventional kind. The carriage 12 is equipped with a hand operated feed wheel 14 so that through parts (not shown) in association with a rack 15 on the bed 11 the said carriage may be shifted to the desired position on the bed.

As is common in lathes, arranged in association with the bed 11 is a lead screw 16 which through parts (not shown) fitted within the carriage 12 automatically feeds the carriage for travel on the bed 11 in the operation of the lathe. These parts (not shown) in association with the carriage 12 and the lead screw 16 are controlled manually from a handled lever or crank 17 whereby said carriage 12 can be released from the lead screw 16 and in this fashion instant cessation of travel of the latter is brought about.

The release or stop constituting the present invention comprises a single arm bracket 18 provided with a clamping end 19 which permits the fastening thereof to the lathe bed 11 and in the arm of the bracket 18 is threaded a set screw 20 arranged in the path of the apron 21 of the carriage 12 at one end of the latter for coacting therewith. The bracket 18 is formed with a cylindrical socketed head 22 closed at one end and open at the other, the socket 23 therein being formed with a circular seat 24 for accommodating therein micrometer half nuts 25, these being held fixed and assembled within said head 22 by a set screw 26, one being diametrically opposite another, threaded in said head. Swiveled in the half nuts 25 when assembled in the head 22 is a micrometer sleeve 27 slidably splined by a key 28 fitting a micrometer release bar or stop rod 29 which is rotatably journaled in the head 22 to be disposed at one side of the bed 11 and substantially parallel therewith. The key 28 fastens a micrometer screw 30 thereto, the latter being workable within the head 22 and within the sleeve 27. The sleeve is socketed or recessed for this purpose, and the socket in the sleeve contains no threads for engagement with the micrometer screw confined therein for threaded engagement at 31 with the said half nuts 25. The release bar or stop rod 29 next to the head stock end of the lathe has fixed thereto a turning crank handle 32 so that the bar or rod may be manually adjusted. The sleeve 27 externally thereof is formed with a micrometer scale 33 coacting with an indicator mark or pointer 34 next thereto and on the beveled end 35 of said head 22. Thus the bar or rod 29 through the micrometer sleeve 27 can be accurately adjusted, the accuracy being had through the coaction of the scale 33 and the pointer or indicator 34.

The lever handle 17 has attached thereto a bell crank arm or lever, the extension 36 of which is suitably recessed and notched for the proper fitting to the said handle 17 and a binding screw 37 secures this bell crank lever to the said handle while the other extension 38 of said bell crank lever has connected thereto a coiled retractile spring 39 which is fixedly engaged at 40 with the carriage 12. Adjacent to the handle 17 is fixed to the apron 21 of the carriage 12 a bracket 41 to which is pivoted at 42 a combined tripping and latching member 43 having a striker head 44 for disposition in the path of the bar or rod 29, to be tripped thereby, the head 44 being formed with a latching lip 45 engageable with a knife edge keeper tip 46 formed on the extension 36 of the bell crank lever so that when the lip 45 is engaged with the tip 46 the handle 17 carrying the bell crank lever will be locked in a position for the feed of the carriage 12 automatically under the influence of the lead screw 16 until the striker head 44 has had contact with the bar or rod 29 whence cessation of travel of the carriage will be had in that the handle 17 becomes automatically released and through the influence of the spring 39 is shifted to unlock the carriage 12 from the feed screw 16 when the lathe is in operation. In this manner automatic carriage release is assured.

By the use of the release or stop the carriage of the lathe will be assured of stoppage at any point along the bed way of the lathe, irrespective of the lead screw speed, and by micrometer adjustment of the bar or rod 29 permits the extension or recession of the same within the limits of the micrometer screw 30 travel and consequently the cutting of internal or external surfaces to a piece of work with utmost accuracy is assured.

In mounting the bracket 18 on the lathe, the clamping end 19 secures this bracket in place and the same is positioned to the point, relative to work to be operated upon, in the lathe where it may be desired to stop the travel of the carriage 12 on the bed 11 of said lathe, the set screw 20 being usable to properly define the position of the carriage 12 with respect to the bar or rod 29 for the automatic release of the carriage from the screw 16 accordingly to the micrometer set of the bar or rod 29 for the tripping of the member 43 when its head 44 contacts with this bar or rod.

The head 22 carries a locking screw 47 which functions to lock the rod or bar 29 within its journal for the purpose of maintaining any desired adjustment of the micrometer screw and also locks the rod 29 through its pressure upon a link 48 to prevent the turning of said rod, the link being for the purpose of preventing the scoring of the rod 29 if it be turned forcibly when locked.

The screw 30 on the rod or bar 29 is threaded in the half nuts 25 when the same are fitted in the seat 24 in the head 22. On the turning of the bar or rod 29 the sleeve 27 rotates therewith, the said screw 30 having forty threads to the inch while the sleeve has the scale 33 graduated into $25/1000$ and such scale 33 coacts with the pointer or indicator 34 enabling the reading of the adjustment of the bar or rod 29.

The adjusting screw 20 is for the purpose of setting accurately the time for the automatic release or stoppage of the carriage 12 through the release or stop device.

This screw 20 on the micrometer bracket is to determine the micrometer bracket's position on the lathe way in relation to the point on the work at which it is desired to stop the tool. Such a setup is clearly indicated in Figure 1 of the drawings. For application of the bracket, the micrometer rod 29 must first be retracted in the micrometer head to its full limit. In this position the micrometer screw is of no utility for the measurement of cuts positively, (toward the headstock) being retracted fully, and can be utilized for measurement only negatively (toward the tailstock). An adjunct to the screw 29 involves an accessory comprising an extension gauge 49 which is in the form of a short rod drilled in one end but not threaded to accommodate therein the said screw 20, the extent of the rod from the inner end of the drill hole therein to the opposite end of the rod being the exact distance between the lateral limits of travel for the micrometer screw. The socket of the extension gauge may be quickly applied over the screw 29 and the adjustment of the screw is thereby extended permitting the corresponding extension of the rod 29 to its full limit for its proper functioning thereafter in measuring cuts positively (toward the headstock). The gauge is immediately removed from the screw 20 after such gauge has been employed thusly to determine the position of the bracket on the bed way, its removal leaving no obstruction to the normal advance of the carriage apron.

The apron 21 carries thereon a buffer lug 50 to be engaged by the extension 38 of the bell crank 36 and impact in the use of such lug will be taken off of the half nut assembly.

What is claimed is:

1. In a release or stop of the kind described, a hanger bracket having a cylindrical head, half nuts releasably fitted in said head, a micrometer rod engaged in said head, a micrometer sleeve slidably splined on the rod and swiveled in said half nuts, a screw on the rod and threaded in said half nuts, and cooperative micrometer scale and indicator means on said sleeve and head, respectively.

2. In a release or stop of the kind described, a hanger bracket having a cylindrical head, half nuts releasably fitted in said head, a micrometer rod engaged in said head, a micrometer sleeve slidably splined on the rod and swiveled in said half nuts, a screw on the rod and threaded in said half nuts, cooperative micrometer scale and indicator means on said sleeve and head, respectively, and means for manually turning the rod.

3. In a release or stop of the kind described, a hanger bracket having a cylindrical head, half nuts releasably fitted in said head, a micrometer rod engaged in said head, a micrometer sleeve slidably splined on the rod and swiveled in said half nuts, a screw on the rod and threaded in said half nuts, cooperative micrometer scale and indicator means on said sleeve and head, respectively, means for manually turning the rod, and means for releasably securing the half nuts in the head.

4. In a release or stop of the kind described, a hanger bracket having a cylindrical head, half nuts releasably fitted in said head, a micrometer rod engaged in said head, a micrometer sleeve slidably splined on the rod and swiveled in said half nuts, a screw on the rod and threaded in said half nuts, cooperative micrometer scale and indicator means on said sleeve and head, respectively, means for manually turning the rod, means for releasably securing the half nuts in the head, and means in the path of said rod and automatically tripped thereby for releasing a feed connection between relatively movable parts.

5. In a release or stop of the kind described, a hanger bracket having a cylindrical head, half nuts releasably fitted in said head, a micrometer rod engaged in said head, a micrometer sleeve slidably splined on the rod and swiveled in said half nuts, a screw on the rod and threaded in said half nuts, cooperative micrometer scale and indicator means on said sleeve and head, respectively, means for manually turning the rod, means for releasably securing the half nuts in the head, means in the path of said rod and automatically tripped thereby for releasing a feed connection between relatively movable parts, and means coacting with the last-named means for normally holding the feeding connection between said parts.

6. In a release or stop of the kind described, a hanger bracket having a cylindrical head, half nuts releasably fitted in said head, a micrometer rod engaged in said head, a micrometer sleeve slidably splined on the rod and swiveled in said half nuts, a screw on the rod and threaded in said half nuts, cooperative micrometer scale and indicator means on said sleeve and head, respectively, means for manually turning the rod, means for releasably securing the half nuts in the head, means in the path of said rod and automatically tripped thereby for releasing a feed connection between relatively movable parts, means coacting with the last-named means for normally holding the feeding connection between said parts, and means for adjustably securing the bracket in place.

7. In a release or stop of the kind described, a hanger bracket having a cylindrical head, half nuts releasably fitted in said head, a micrometer rod engaged in said head, a micrometer sleeve slidably splined on the rod and swiveled in said half nuts, a screw on the rod and threaded in said half nuts, cooperative micrometer scale and indicator means on said sleeve and head, respectively, means for manually turning the rod, means for releasably securing the half nuts in the head, means in the path of said rod and automatically tripped thereby for releasing a feed connection between relatively movable parts, means coacting with the last-named means for normally holding the feeding connection between said parts, means for adjustably securing the bracket in place, and an adjusting screw on the bracket for coaction with one of said parts.

8. In a release or stop of the kind described, a hanger bracket having a cylindrical head, half nuts releasably fitted in said head, a micrometer rod engaged in said head, a micrometer sleeve slidably splined on the rod and swiveled in said half nuts, a screw on the rod and threaded in said half nuts, cooperative micrometer scale and indicator means on said sleeve and head, respectively, means for manually turning the rod, means for releasably securing the half nuts in the head, means in the path of said rod and automatically tripped thereby for releasing a feed connection between relatively movable parts, and means for attaching said tripping and releasing members to the respectively moving parts.

9. In a release or stop of the kind described, a hanger bracket having a cylindrical head, half nuts releasably fitted in said head, a micrometer rod engaged in said head, a micrometer sleeve slidably splined on the rod and swiveled in said half nuts, a screw on the rod and threaded in said half nuts, cooperative micrometer scale and indicator means on said sleeve and head, respectively, means for manually turning the rod, means for releasably securing the half nuts in the head, means in the path of said rod and automatically tripped thereby for releasing a feed connection between relatively movable parts, means coacting with the last-named means for normally holding the feeding connection between said parts, means for adjustably securing the bracket in place, an adjusting screw on the bracket for coaction with one of said parts, and means for attaching said tripping and releasing members to the respectively moving parts.

LAURENCE HARRINGTON RANDALL.